June 18, 1968  E. L. CLARY ET AL  3,388,611

CONTROL LINKAGE

Filed Jan. 25, 1966

INVENTORS
Edward L. Clary &
Ronald L. Harris
BY
E. J. Biskup
ATTORNEY

United States Patent Office 3,388,611
Patented June 18, 1968

3,388,611
CONTROL LINKAGE
Edward L. Clary and Ronald L. Harris, Fenton, Mich., assignors to General Motors Corporation, Detroit, Mich., a corporation of Delaware
Filed Jan. 25, 1966, Ser. No. 522,899
8 Claims. (Cl. 74—513)

ABSTRACT OF THE DISCLOSURE

A hinge connector for a control linkage wherein a plastic connector member having tubular end portions receiving the free ends of a link and a lever has a reduced intermediate section forming a flexible hinge that permits relative pivotal movement between the links upon actuation of the linkage.

---

Conventional throttle control linkage for a motor vehicle commonly comprises a pair of operatively interconnected links which extend between the throttle pedal and the carburetor lever and are secured together and pivotally jointed at their adjacent free end portions by a hinge assembly. The hinge assembly generaly includes a variety of bushings, pins, washers, nuts, etc. Such a relatively complicated hinge assembly is rather difficult to assemble and introduces maintenance and adjustment problems as the joint component parts wear.

The control linkage described herein includes an easily assembled and adjusted connector and hinge assembly which is intended to replace such conventional hinges. The connector of this invention comprises a one-piece body molded from plastic or other suitable elastic material having the desired characteristics of resilience and fatigue strength. Opposite end portions of the connector are adapted to be secured to the adjacent free end portions of the links and a reduced section of the connector intermediate the connector end portions forms a flexible hinge to provide a pivot point in the linkage assembly. The connector may further include linkage adjustment means to permit adjustment of the distance between linkage pivot points. Assembly of the linkage is easily made due to the few parts involved and, since the connector itself has no parts subject to wear, linkage adjustment will seldom be needed. In addition, the connector provides a corrosion resistant joint since it is formed from a non-corrosive material.

A feature of this invention is that it provides control linkage which incorporates a one-piece connector with an integral flexible hinge.

Another feature of this invention is that the connector may be provided with associated linkage adjustment capabilities.

A further feature is that the connector may have a number of integral flexible hinges to provide the linkage with a universal action.

The features of this invention will be made apparent in the following detailed description taken in connection with the accompanying drawings wherein.

Figure 1:
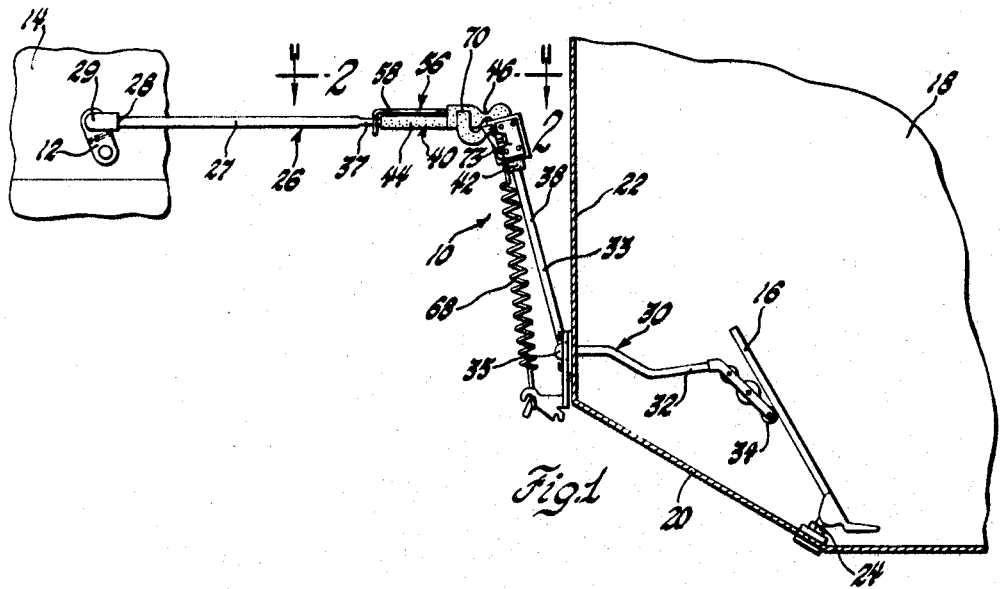
FIGURE 1 is a side elevational view of a throttle control system embodying control linkage according to the present invention.

Referring to FIGURE 1, there is shown a motor vehicle throttle control system 10 which includes a throttle lever 12 rotatably movable to open and close the throttle valves of a conventional carburetor 14. Throttle lever movement is initiated by actuation of an accelerator pedal 16 located within the vehicle passenger compartment 18 which is here partially defined by a floor pan 20 and upwardly extending fire wall 22. The accelerator pedal 16 is secured to the floor pan 20 by ball stud 24 in a conventional manner allowing the pedal to be depressed by the operator's foot. The throttle lever 12 and accelerator pedal 16 are operatively interconnected by throttle contral linkage 26 according to this invention.

The control linkage 26 includes a throttle rod 27 which has an end portion 28 pivotally connected to the throttle lever 12 at pivot point 29 by any suitable means and extends generally horizontally and rearwardly towards the passenger compartment 18. A throttle operating lever 30, interposed between the throttle rod 27 and accelerator pedal 16 passes through an opening in the fire wall 22 and includes a portion 32 within the compartment 18 and a portion 33 outside the compartment which extends generally forward and upward at an oblique angle. The lever 30 is secured to the fire wall 22 by a suitable bracket or retainer 35 and is rotatable therewithin. The portion 32 has a roller 34 at the end thereof in engagement with the under surface of the accelerator pedal 16 to hold the pedal in an operable position above the floor pan 20. The throttle rod 27 and operating lever 30 may both be cylindrical in cross-section and have adjacent free end portions 37 and 38 respectively which are joined by the connector 40 according to this invention. The end portion 37 map have parallel flat surfaces 41 at top and bottom to provide a generally rectangular cross-section.

Figure 2:
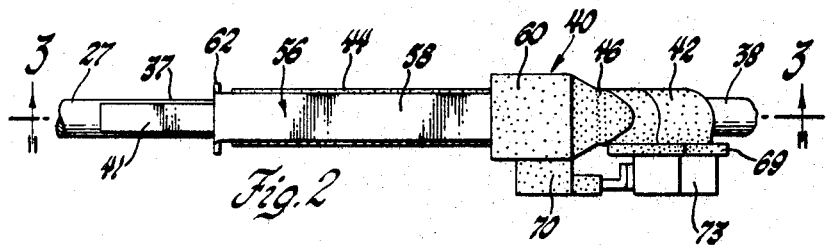
FIGURE 2 is an enlarged plan view of the connector taken generally along a plane indicated by the line 2—2 of FIGURE 1.
Figures 3, 4:
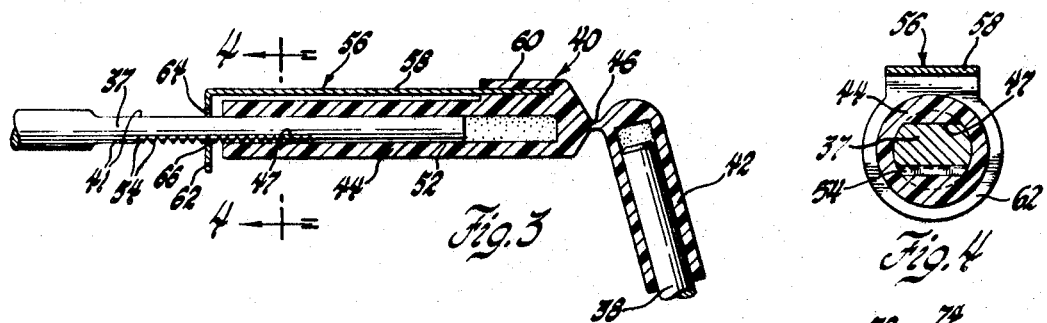
FIGURE 3 is a view, partially in section, taken generally along a plane indicated by the line 3—3 of FIGURE 2.
FIGURE 4 is an enlarged sectional view taken generally along a plane indicated by the line 4—4 of FIGURE 3.

As shown in FIGURES 2 and 3, the connector 40 is a one-piece elongate member having relatively rigid tubular end portions 42 and 44 which are joined by a reduced area portion of the connector which forms a flexible hinge 46. The connector may be formed or molded from any suitable plastic or similar elastic material having the required characteristics of flexibility and fatigue resistance needed for flexible hinges. It has been found that polypropylene has the desired characteristics and it is the presently preferred material for the connector.

To assemble the connector 40 to the throttle rod 27 and lever 30 the tubular end portion 42 may be pressed or shrunk onto lever free end portion 38. The lengthwise aperture 47 of connector end portion 44 is complementary in shape to the generally rectangular throttle rod end portion 37 and in the preferred embodiment of the invention end portion 37 is received by the aperture 47 with a slip fit to permit adjustment of the throttle rod within the connector as will be described hereinafter. It should be realized, however, that this connection may also be an interference fit if adjustment means are not desired or needed or that both ends of the connector may be made adjustable if desired.

In the preferred embodiment of the invention adjustment means are provided at the connector end portion 44 to permit adjustment of the effective length of throttle rod 27 and, accordingly, the distance between the linkage pivot point 29 at the throttle lever 12 and the flexible hinge 46. A series of identical notches 54 is cut or formed in the bottom flat surface 52 of the rod end portion 37 transverse to the rod longitudinal axis. The notches 54 may be V-shaped as shown in FIGURE 3, or square, or of various other shapes. An adjustment pawl 56 is engageable with each of the notches 54 to permit the connector end portion 44 to be selectively positioned upon the throttle rod 27. The pawl 56 consists of a blade spring 58 anchored in a thickened body portion 60 of the connector and extending generally horizontally forward and parallel the member 44, and a downwardly turned tongue 62 at the spring free end having an aperture 64 therethrough which has a shape similar to the rod end portion 37 but has sufficient clearance to allow the end portion 37 to pass freely therethrough. The bottom lip 66 about the aperture is engageable within any of the notches 54 to lock the rod 27 and connector 40 together. To adjust the linkage, the spring 58 is depressed to disengage the lip 66 from the notch 54. The connector 40 is then moved forward or back on the rod to the desired position and the spring is released to allow the lip 66 to move upwardly and engage the corresponding notch. Clearance between the spring 58 and member 44 is sufficient to permit disengagement of the lip 66 from the notch 54 but small enough to prevent permanent deformation of the spring when fully depressed against the member 44.

Pivotal movement of the throttle rod 27 and operating lever 30 relative to each other occurs at the flexible hinge 46. When the accelerator pedal 16 is depressed, the operating lever 30 is rotated within the bracket 35 causing portion 32 to move downwardly toward the floor pan 20 and portion 33 to move rearwardly toward the fire wall 22. In turn, the throttle rod 27 is drawn axially rearwardly causing the throttle lever 12 to rotate and open the carburetor throttle valves. A conventional return spring 68 returns the linkage toward its normal idle position as the pedal 16 is released.

Figures 5, 6:
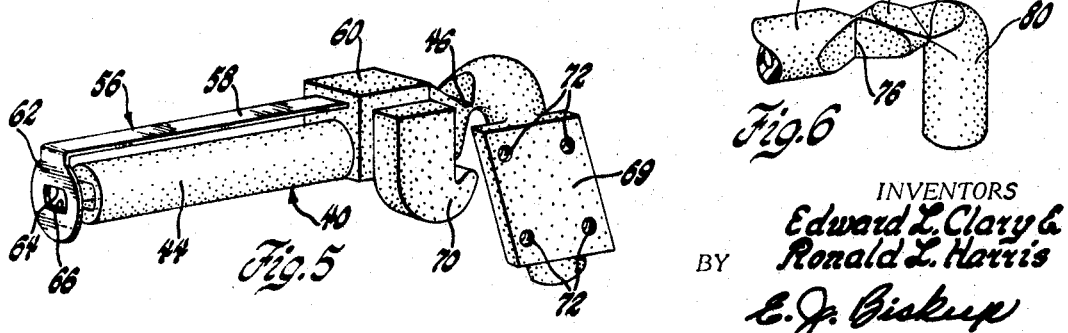
FIGURE 5 is a perspective view of the connector.
FIGURE 6 is a perspective view of a modification of the connector.

The connector 40 may be provided with supplementary devices and functions if desired. Thus, as seen in FIGURES 1, 2 and 5, a switch mounting pad 69 may be integrally formed on the portion 42 and a switch stop 70 may be integrally formed on the portion 44. The switch pad 69 may have threaded bolt holes 72, or other means, by which an idle switch 37, shown in FIGURE 2, may be mounted.

As seen in FIGURE 6, the connector may be modified to include a pair of flexible hinges 74 and 76 to provide the connector with a universal action. One of the hinges 74 lies in a generally horizontal plane while the second hinge 76 lies in a generally vertical plane. The mutually perpendicular hinges 74 and 76 are separated by a body portion 78 and both are located between the integral with the connector tubular end portions 80 and 82. With this arrangement the connector and its associated linkage is movable in a vertical plane about the flexible hinge 74 and movable in a horizontal plane about the flexible hinge 76.

Various changes and modifications can be made in the above described structure without departing from the spirit of the invention. Such changes and modifications are contemplated by the inventors and we do not intend to be limited except by the scope of the claims which follow.

We claim:

1. A control linkage, comprising: a link having one end portion thereof engageable with a member being controlled and having a free end portion; a lever having one end portion thereof engageable with a control member and having a free end portion located adjacent the free end portion of said link; and a one-piece connector molded from an elastic material, said connector being formed as an elongate body with generally tubular end portions and a reduced intermediate section forming a flexible hinge, the tubular end portions of said connector receiving said free end portions of said link and said lever to operatively interconnect said lever and said link, said link and said lever when actuated being pivotally movable about said flexible hinge.

2. The invention recited in claim 1 wherein said connector tubular end portions are relatively rigid and at least one of said free end portions is received within one of said tubular end portions with an interference fit.

3. The invention recited in claim 1 wherein said control linkage includes means for adjustably locking at least one said free end portion to said connector.

4. The invention recited in claim 3 wherein said adjustment means includes a plurality of adjustment notches in the surface of one of said free end portions, and an adjustment pawl attached to said connector and selectively engageable with each of said notches to lock said free end portion to said connector.

5. The invention recited in claim 4 wherein said adjustment pawl includes a blade spring having an end portion anchored in said connector and a free end portion, and an apertured tongue depending from said blade spring free end portion through which one of said free end portions is received, the portion of said tongue adjacent the aperture forming a lip normally engaged in one of said adjustment notches to lock said free end portion to said connector, said lip being disengaged from said notch by depressing said blade spring.

6. The invention recited in claim 1 wherein said connector includes a pair of flexible hinges intermediate said tubular end portions, said hinges being arranged for flexural movement about mutually perpendicular axes to impart a universal action to the control linkage.

7. A control linkage, comprising: a one-piece elastomeric connector member having generally tubular end portions and a reduced intermediate section forming a flexible hinge; a lever having one end portion engageable with a member being controlled and the other end portion operatively connected to one of said tubular end portions of said connector member; and a link having one end portion engageable with a control member and the other end portion operatively connected to the other of said tubular end portions whereby actuation of said link causes relative pivotal movement of said link with respect to said lever about said flexible hinge.

8. A throttle control linkage for a motor vehicle including an accelerator pedal, a carburetor, and carburetor throttle lever, comprising: a one-piece elastomeric connector member having generally tubular end portions and a reduced intermediate section forming a flexible hinge; a link having one end portion operatively connected to said carburetor throttle lever and the other end portion received within and operatively connected to one of said tubular end portions of said connector member; and a lever having one end portion in engagement with and actuated by the accelerator pedal and the other end portion received within and operatively connected to the other of said tubular end portions whereby actuation of said accelerator pedal causes relative pivotal movement of said lever with respect to said link about said flexible hinge thereby imparting controlled movement to said carburetor throttle lever.

References Cited

UNITED STATES PATENTS

| 2,860,495 | 11/1958 | Stark | 64—15 X |
| 3,264,896 | 8/1966 | Gorsky | 74—516 |
| 3,332,255 | 7/1967 | Seagreaves et al. | 64—11 |

FOREIGN PATENTS

| 1,002,800 | 8/1965 | Great Britain. |

MILTON KAUFMAN, *Primary Examiner.*

UNITED STATES PATENT OFFICE
CERTIFICATE OF CORRECTION

Patent No. 3,388,611            June 18, 1968

Edward L. Clary et al.

It is certified that error appears in the above identified patent and that said Letters Patent are hereby corrected as shown below:

Column 1, line 22, after "carburetor" insert -- throttle --. Column 2, line 36, "map" should read -- may --. Column 3, line 38, "37" should read -- 73 --; line 46, "the" should read -- and --. Column 4, line 9, after "one" insert -- of --; same line 9, "portion" should read -- portions --.

Signed and sealed this 4th day of November 1969.

SEAL)

Attest:

Edward M. Fletcher, Jr.            WILLIAM E. SCHUYLER, JR.
Attesting Officer            Commissioner of Patents